United States Patent [19]

Pizzuti et al.

[11] Patent Number: 4,460,942
[45] Date of Patent: Jul. 17, 1984

[54] ELECTRONIC FLASH WITH FLASHTUBE RETENTION STRAP

[75] Inventors: Donato F. Pizzuti, Lynnfield; Narvous Stamps, Jr., Framingham, both of Mass.

[73] Assignee: Polaroid Corporation, Cambridge, Mass.

[21] Appl. No.: 503,802

[22] Filed: Jun. 13, 1983

[51] Int. Cl.³ .............................................. F21S 3/00
[52] U.S. Cl. .................................... 362/217; 362/10; 362/16; 362/223; 362/278; 362/307; 362/310; 362/319; 362/320; 362/375; 362/376
[58] Field of Search .................. 362/10, 16, 217, 223, 362/278, 307, 310, 319, 320, 375, 376

[56] References Cited

U.S. PATENT DOCUMENTS 3,484,597 12/1969 Schmidt ................................ 240/1.3
4,317,625 3/1982 Van Allen ............................ 354/145
4,412,276 10/1983 Blinow ................................. 362/320

Primary Examiner—Stephen J. Lechert, Jr.
Attorney, Agent, or Firm—Edward S. Roman

[57] ABSTRACT

An electronic flashtube is fixedly mounted to a reflector housing by an elongated elastomeric strap having openings therethrough at opposite ends thereof for engaging respectively the opposite end portions of the flashtube which extend from the reflector housing. The elongated strap extends across the exterior of the reflector housing so as to yieldably bias the flashtube toward that portion of the reflector housing across which the strap extends.

8 Claims, 4 Drawing Figures

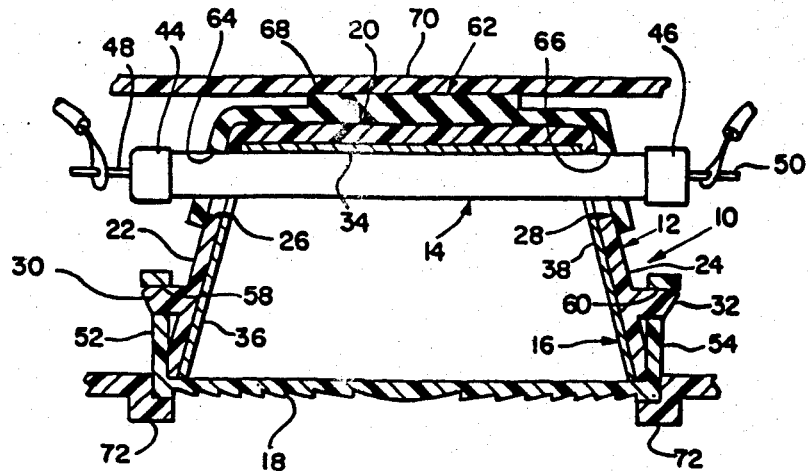
FIG. 4
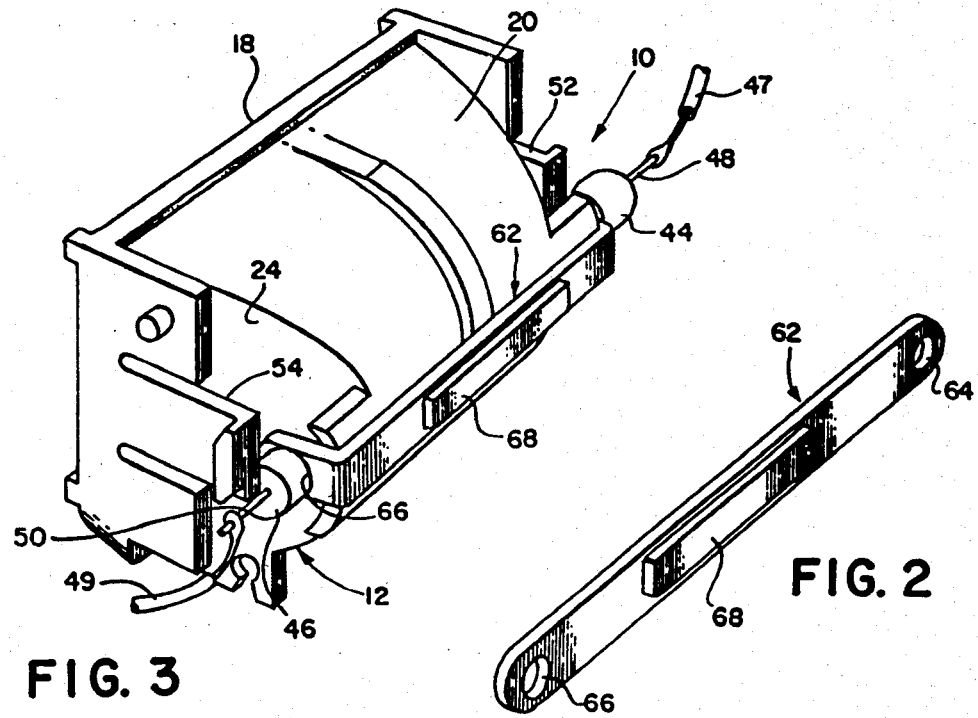
FIG. 3
FIG. 2

ELECTRONIC FLASH WITH FLASHTUBE RETENTION STRAP

BACKGROUND OF THE INVENTION

1. Field of the Invention

This invention relates generally to a flashtube retention strap for an electronic flash and, more particularly, to a flashtube retention strap which minimizes the size of the electronic flash while simultaneously maintaining the flash within a flash housing.

2. Description of the Prior Art

The use of electronic flash units primarily for photographic apparatus is well known. Such electronic flash units typically comprise a housing assembly including a parabolic reflector and a flashtube of the gas discharge type mounted within the reflector. To insure quality photographs when using electronic flash, it will be appreciated that the light output values and the light distribution pattern must be consistently repeatable; otherwise, the strobes would not perform in the intended manner, and the quality of the resultant photographs would, of course, suffer. Towards this end the flashtube must be precisely located in a fixed position relative to the reflector. One well-known method for retaining the flashtube in a fixed position relative to its reflector housing is disclosed in U.S. Pat. No. 4,317,625, entitled "Strobe Reflector Assembly", by David Van Allen, issued Mar. 2, 1982, in common assignment herewith and now incorporated by reference herein wherein they are provided a pair of generally L-shaped retaining members extending outwardly from opposite ends of the main wall of the reflector housing adjacent the apex thereof. The flashtube is installed longitudinally within the reflector housing in the usual manner such that the opposite ends of the flashtube extend laterally outward from the sides of the reflector housing. Resilient bands are slipped over the ends of the flashtube and the L-shaped retaining members to maintain the flashtube in fixed position relative to the reflector housing. Such resilient bands, however, do not provide insulation around the entire circumference of the flashtube thereby allowing the possibility of an electrical spark arking between the leads of the flashtube and the metal reflector if sufficient spacing is not provided between the metal reflector and the leads from the flashtube.

Flashtube assemblies of the aforementioned type generally are mounted in flash housings which may be integrally formed with a photographic camera apparatus when such flash units form an integral part of a photographic camera system. Such flash housings generally comprise a forward wall with a window therethrough against which the flash assembly must be fixedly maintained with the flash lens in registration with the window in the flash housing front wall. Additional components or parts are usually required to mount the flash assembly within the flash housing.

Therefore, it is a primary object of this invention to provide a simple and economical flashtube assembly of minimum size which may be conveniently mounted in a flash housing without the provision of additional components or parts for such mounting.

It is a further object of this invention to provide an electronic flashtube assembly in which the flashtube is fixedly mounted relative to the reflector housing by an elongated elastomeric strap which facilitates a minimum spacing between the flashtube leads and the metal reflector.

It is an even further object of this invention to provide an electronic flash assembly with an elongated elastomeric strap to mount the flashtube relative to the reflector housing while simultaneously operating to maintain the flash assembly in juxtaposition with respect to the forward wall of a flash housing.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

An electronic flash assembly comprises a reflector housing including two opposed side wall sections arranged to define an open-ended cavity wherein each of the side wall sections includes an opening therethrough. An elongated flashtube is disposed within the cavity such that the opposite end portions thereof extend respectively through the openings in the side walls. A light reflective surface is located interiorly of the reflector housing so as to reflect light through the open end of the cavity. An elongated elastomeric strap having openings therethrough at opposite ends thereof is provided to engage respectively the opposite end portions of the flashtube which extend through the side wall openings. The strap also extends across the exterior of the reflector housing between the side walls so as to yieldably bias the flashtube toward that portion of the reflector housing across which the strap extends.

The openings in the strap engage the entire circumference of the flashtube to provide 360 degrees of insulation around each end of the flashtube which extends from a respective one of the side walls so as to facilitate a decrease in the spacing required between the leads from the ends of the flashtube and the light reflective surface. The elastomeric strap also includes a raised portion between the openings which is disposed between a flash housing back wall portion and the reflector housing so as to yieldably bias the reflector housing toward a front wall portion of the flash housing.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment when read in connection with the accompanying drawings wherein:

FIG. 2 is a perspective view showing the elongated strap of this invention;

FIG. 3 is a rear perspective showing a flashtube assembly in which the elastomeric strap of this invention is utilized to retain a flashtube within a reflector housing; and FIG. 4 is a cross-sectional view of the flash assembly of FIG. 3 stationed within a flash housing.

DESCRIPTION OF THE PREFERRED EMBODIMENT

Figure 1:
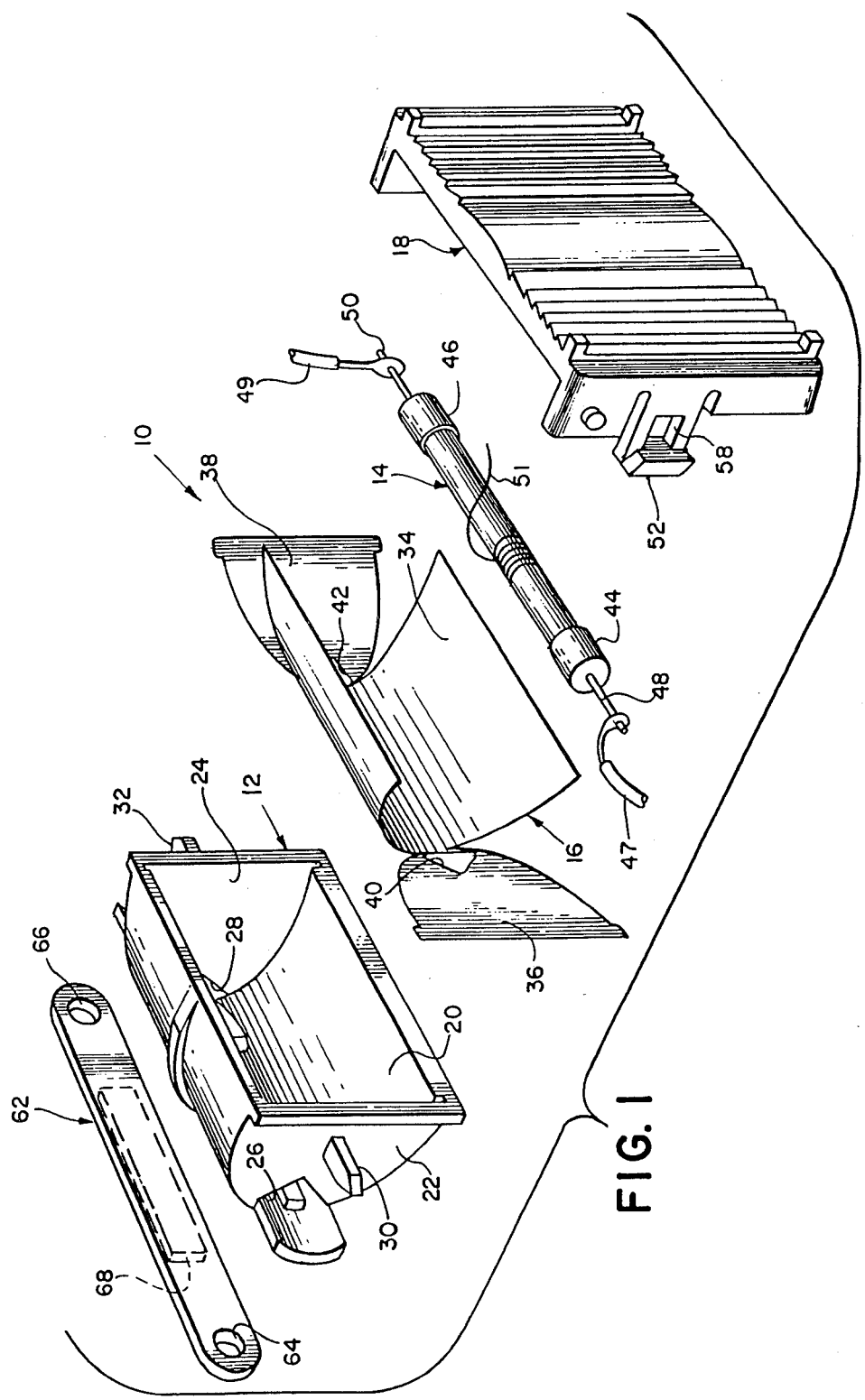
FIG. 1 is an exploded perspective view showing the various components of an electronic flash assembly.

Referring now to FIG. 1, there is shown generally at 10 a flashtube assembly comprising a reflector housing 12, a flashtube 14 of the gas discharge type, a reflector insert 16, and a lens 18. The reflector housing 12 comprises a main wall 20 having a generally parabolic cross section connecting two side wall sections 22, 24 so as to collectively define an open-ended cavity. The side wall sections 22, 24 include, respectively, triangularly shaped openings 26, 28 through which the flashtube 14 may be inserted in a well-known manner. Integral detents 30, 32 extend laterally from respective side wall sections 22, 24 for reasons which will become apparent from the following discussion. The reflector housing may be injection molded from any suitable thermoplastic material in a manner as is well known in the art.

The open-ended cavity of the reflector housing 12 is sized to receive and retain the reflector insert 16 which may be made of any suitable flexible metal provided with a highly polished light reflecting surface. The reflector insert 16 comprises a main wall 34 which may be bent to the generally parabolic shape of the reflector housing main wall 20 together with two opposed side wall sections 36, 38 which are inserted respectively in juxtaposition with the reflector housing side wall sections 22, 24. Side wall sections 36, 38 of the reflector insert 16 also include, respectively, therethrough triangularly shaped openings 40, 42 which register respectively with the openings 26, 28 upon installation of the reflector insert 16 within the reflector housing 12.

The flashtube 14 is of the conventional gas discharge type and may be inserted longitudinally through the openings 26, 28 in the reflector housing 12 such that end portions as shown at 44, 46 extend respectively laterally outward from the side wall sections 22, 24. The opposite end portions 44, 46 of the flashtube 14 include respectively terminals 48, 50 which connect respectively to lead wires 47, 49. A trigger lead shown at 51 may be connected to the flashtube 14 in the usual manner.

Referring now to the flash lens 18, it can be seen to include extending laterally outward from opposite sides thereof integral spring fingers 52, 54. The spring fingers 52, 54 include, respectively, openings 58, 60 therethrough for respective engagement with the detents 30, 32 from the reflector housing 12. Thus, the lens 18 may be snap fitted to the reflector housing 12 by the openings 58, 60 in the spring fingers 52, 54 engaging respectively the detents 30, 32 as shown in FIG. 1. The front face of the lens 18 is lenticulated in a well-known manner to direct the light generated by the flashtube 14 toward the scene to be photographed.

The flashtube 14 after its insertion in the aforementioned manner within the reflector housing 12 is maintained in fixed connection relative to the reflector housing 12 in the manner of this invention by an elongated elastomeric strap 62. The strap 62 includes circular openings 64, 66 at the opposite ends thereof which engage respectively the end portions 44, 46 of the flashtube 14. The strap 62 is arranged upon insertion of the ends of the flashtube 14 through the openings 64, 66 to extend across the exterior of the main wall 20 of the reflector housing 12 and thereby yieldably bias the flashtube 14 toward the main wall 20 against the triangular sides of the openings 26, 28 in the side walls 22, 24. The openings 64, 66 at the opposite ends of the strap 62 are configured to engage the entire circumference of the flashtube 14 so as to provide 360 degrees of insulation around each end 44, 46 of the flashtube 14 and thereby allow a minimum spacing between the leads 47, 48 which connect respectively to the flashtube terminals 48, 50 and the flexible metal reflector insert 16. Thus, the size of the flashtube assembly 10 can be minimized as a direct result of the configuration of the elastomeric strap 62 of this invention which provides a full 360 degrees of insulation around each end 44, 46 of the flashtube 14.

The flashtube assembly 10 is preferably stationed within a flash housing as best viewed in FIG. 4 wherein the flash housing includes a back wall portion 70 and a front wall portion 72 having a window therethrough aligned in registration with the open end of the reflector cavity and in engagement with the edge of the lens 18. In order to maintain the flashtube assembly 10 and more specifically the lens 18 in juxtaposition with the front wall portion 72 of the flash housing, the elongated elastomeric strap 62 is provided with a raised portion 68 for engaging the back wall portion 70 of the flash housing so as to yieldably bias the flashtube assembly 10 and its associated lens 18 toward the front wall portion 72 of the flash housing. In this manner, the lens 18 is maintained in juxtaposition to the window and the front wall portion 72 of the flash housing in a simple and economical manner without the provision of additional components specifically designed for this purpose. Thus the raised portion 68 of the strap 62 sandwiched between the back wall portion 70 of the flash housing and the back section of the main wall 20 of the reflector housing 12 operates to yieldably bias the reflector housing and its associated lens 18 toward the front wall portion 72 of the flash housing so as to maintain the lens 18 in juxtaposition with the front window of the front wall 72.

It will be appreciated, therefore, that the elongated elastomeric strap 62 of this invention provides for a simple and economical flashtube assembly of minimum size which may be conveniently mounted in a flash housing without the provision of additional components or parts for such mounting. Therefore, it will be appreciated that since certain changes may be made in the above-described system and apparatus without departing from the scope of the invention herein involved, it is intended that all matter contained in this description thereof, or shown in the accompanying drawings shall be interpreted as illustrative and not in a limiting sense.

What is claimed is:

1. In an electronic flash of the type having a reflector housing with two opposed side wall sections arranged to define an open ended cavity wherein each of the side wall sections includes an opening therethrough, an elongated flashtube disposed within the cavity such that the opposite end portions thereof extend respectively through the openings in the side walls, and a light reflective surface located interiorly of the reflector housing so as to reflect light through the open end of the cavity, the improvement comprising:

an elongated elastomeric strap having openings therethrough at opposite ends thereof for engaging respectively the opposite end portions of the flashtube which extend through the side wall openings, said strap extending across the exterior of the reflector housing between the side walls so as to yieldably bias the flash tube toward the portion of the reflector housing across which said strap extends.

2. The improvement of claim 1 wherein said openings in said strap engage the entire circumference of the flashtube to provide 360° of insulation around each end of the flashtube which extends from a respective side wall thereby facilitating a decrease in the spacing required between the leads from the ends of the flashtube and the light reflective surface.

3. The improvement of claim 1 wherein the reflector housing is stationed within a flash housing having a back wall portion and a front wall portion with a window therethrough aligned in registration with the open end of the reflector cavity and wherein said elastomeric strap includes a raised portion between said openings at the opposite ends thereof, said raised portion of said strap being disposed between the flash housing back wall portion and the reflector housing so as to yieldably bias the reflector housing toward the front wall portion of the flash housing.

4. The improvement of claim 1 wherein: the reflector housing includes a main wall extending between the side wall sections of the reflector housing; said elastomeric strap extends across the outside surface of the back of the main wall of the reflector housing so as to yieldably bias the flashtube toward the back of the main wall of the reflector housing; said openings in said strap engage the entire circumference of the flashtube to provide 360° of insulation around each end of the flashtube which extends from a respective side wall thereby facilitating a decrease in the spacing required between the leads from the ends of the flashtube and the light reflective surface; the reflector housing is stationed within a flash housing having a back wall portion and a front wall portion with a window therethrough aligned in registration with the open end of the reflector cavity; and said elastomeric strap includes a raised portion between said openings at the opposite ends thereof, said raised portion of said strap being disposed between the back wall portion of the flash housing and the back of the main wall of the reflector housing so as to yieldably bias the reflector housing toward the front wall portion of the flash housing.

5. An electronic flash comprising:
   a reflector housing including two opposed side wall sections arranged to define an open ended cavity, each of said side wall sections including an opening therethrough;
   an elongated flashtube disposed within said cavity such that the opposite end portions thereof extend respectively through the openings in said side walls;
   a light reflective surface located interiorly of the reflector housing so as to reflect light through the open end of said cavity; and
   an elongated elastomeric strap having openings therethrough at opposite ends thereof for engaging respectively the opposite end portions of said flashtube which extend through said side wall openings, said strap extending across the exterior of said reflector housing between said side walls so as to yieldably bias said flashtube toward the portion of said reflector housing across which said strap extends.

6. The electronic flash of claim 5 wherein said openings in said strap engage the entire circumference of the flashtube to provide 360° of insulation around each end of the flashtube which extends from a respective one of said side walls thereby facilitating a decrease in the spacing required between the leads from the ends of said flashtube and said light reflective surface.

7. The electronic flash of claim 6 including a flash housing within which said reflector housing is stationed, said flash housing having a back wall portion and a front wall portion with a window therethrough aligned in registration with the open end of said reflector cavity, said elastomeric strap including a raised portion between said openings at the opposite ends thereof, said raised portion of said strap being disposed between said flash housing back wall portion and said reflector housing so as to yieldably bias said reflector housing toward the front wall portion of said flash housing.

8. The electronic flash of claim 7 including a flash housing within which said reflector housing is stationed wherein: said reflector housing includes a main wall extending between said side wall sections of said reflector housing; said elastomeric strap extends across the outside surface of the back of said main wall of said reflector housing so as to yieldably bias said flashtube toward the back of said main wall of said reflector housing; said openings in said strap engage the entire circumference of said flashtube to provide 360° of insulation around each end of said flashtube which extends from a respective side wall thereby facilitating a decrease in the spacing required between the leads from the ends of said flashtube and said light reflective surface; said flash housing includes a back wall portion and a front wall portion with a window therethrough aligned in registration with the open end of said reflector cavity; and said elastomeric strap includes a raised portion between its said openings at the opposite ends thereof, said raised portion of said strap being disposed between the back wall portion of said flash housing and the back of said main wall of said reflector housing so as to yieldably bias said reflector housing toward the front wall portion of said flash housing.

* * * * *